(12) United States Patent
Bursey et al.

(10) Patent No.: US 7,356,497 B1
(45) Date of Patent: Apr. 8, 2008

(54) SYSTEMS, APPARATUS AND METHODS FOR ESTABLISHING A FLAT FEE BROKERAGE ACCOUNT SYSTEM

(75) Inventors: Bruce Bursey, Wayne, NJ (US); Eric T. Jones, Highland Mills, NY (US); Gerry Goertz, Asheville, NC (US); Alex Csillag, deceased, late of Morristown, NJ (US); by Patricia Csillag, legal representative, Morristown, NJ (US); Richard Mitterando, Fairhaven, NJ (US)

(73) Assignee: UBS Financial Services Inc., Weehawken, NJ (US)

( * ) Notice: Subject to any disclaimer, the term of this patent is extended or adjusted under 35 U.S.C. 154(b) by 1418 days.

(21) Appl. No.: 09/948,934

(22) Filed: Sep. 7, 2001

Related U.S. Application Data

(60) Provisional application No. 60/232,353, filed on Sep. 14, 2000.

(51) Int. Cl.
*G06Q 40/00* (2006.01)
(52) U.S. Cl. .............................. 705/36; 705/35; 705/37
(58) Field of Classification Search ............. 705/33–37
See application file for complete search history.

(56) References Cited

U.S. PATENT DOCUMENTS

| | | | |
|---|---|---|---|
| 6,018,722 A * | 1/2000 | Ray et al. .................. | 705/36 R |
| 6,226,623 B1 * | 5/2001 | Schein et al. ................. | 705/35 |
| 6,324,523 B1 * | 11/2001 | Killeen et al. ............ | 705/36 R |
| 6,354,490 B1 * | 3/2002 | Weiss et al. ................. | 235/379 |
| 6,615,188 B1 * | 9/2003 | Breen et al. .................. | 705/37 |
| 2003/0208427 A1 * | 11/2003 | Peters et al. .................. | 705/36 |

OTHER PUBLICATIONS

"Fee Structure View"; Mark Del Franco. Catalog Age. New Canaan: Aug. 1998.vol. 15, Iss. 9; p. 37, 1 pgs.*
"New Investment Direction Brokers Turning to Flat-Fee Service to Manage Assets for Their Clients"; Daily News. Los Angeles, Calif.: Apr. 6, 1997. p. B.3.*

* cited by examiner

*Primary Examiner*—Harish T. Dass
(74) *Attorney, Agent, or Firm*—Michael Bednarek; Paul, Hastings, Janofsky & Walker LLP

(57) ABSTRACT

A method including establishing a commission-free fee-based brokerage account for a client and maintaining a balance between the account's fee, its investment activity and services received, and compensation to a financial advisor of the client. Customized flat fee pricing can be calculated based on investment objectives, risk tolerances, asset mix, asset size, expected trading patterns, utilization of other firm services and the client account relationship (the existence of other accounts of that client with the firm). Systems calculate and recommend a fee to the financial advisor, who then negotiates with the client and determines a final fee. This dynamic pricing process includes a compensation adjustment to the financial advisor under certain pricing and trading scenarios.

29 Claims, 12 Drawing Sheets

SYSTEMS, APPARATUS AND METHODS FOR ESTABLISHING A FLAT FEE BROKERAGE ACCOUNT SYSTEM

This application claims the benefit of prior copending U.S. Provisional Patent Application Ser. No. 60/232,353, filed Sep. 14, 2000.

FIELD OF THE INVENTION

This invention relates to methods and systems for doing business by a financial services firm and its representatives who provide investment advice and other brokerage services for a single asset-based fee.

BACKGROUND OF THE INVENTION

Financial services firms and their representatives provide investment advice, execute investment transactions, maintain investment accounts and perform a variety of financial planning and other services for the firm's clients. All of these transactions are governed by regulations designed to protect the client, the financial services firm and the representatives ("financial advisors"). An important factor in risk assignment is the length of the period of time for a particular risk that is appropriate for the particular client.

The amount of trading in a particular account is an important factor that the client and the financial advisor must both keep in mind. Since commissions are paid on transactions the client is not helped by unnecessary trading in its account. On the other hand, a reasonable amount of trading is necessary to maintain a balance between the client's risk tolerance and account growth potential. Typically, commissions are paid on individual trades. These commissions are set at rates that reflect the expertise available to the client as investment advice and are typically negotiated for each trade. Thus financial services firms that have established research departments to advise clients will charge higher commissions than firms (so-called "discount brokers") that merely execute transactions without providing investment advice.

For clients with substantial investment portfolios that are actively traded, annual brokerage fees may be charged in lieu of individual trade commissions. Such a commission-free system requires certain safeguards. The appropriate clients have to be identified and the system has to be explained candidly to the identified clients. The amount of trading by the client has to be limited in some way so that excessive trading is not encouraged by the absence of individual transaction fees. Typically, this is accomplished by placing limits on the number of commission-free transactions.

In prior systems, fixed fees are structured for a particular asset class within an account. Thus, there would be one fixed fee for stock securities, another for fixed investment securities such as bonds, and yet another for cash or money market funds, etc. This array of fees was believed to be necessary in order to allow for appropriate pricing of the account, i.e., such predictability was deemed necessary to properly price the services.

However, the prior systems lack a method for determining a single pricing structure for financial advisory services which cuts across the various investment classes and which does not vary greatly from one billing period to another despite variations in the asset classes held at any particular point in time, but instead yields a flat fee designed to be appropriate over an extended period of time. The prior systems lack a method that allows appropriate pricing of a service that will permit the client to trade all classes of investments appropriate for the client in a single account, without having to incur fees that lack consistency over extended periods of time since they are subject to variations in the asset classes held in the account. Furthermore, when the fees are different for each asset class, and those fees are blended (as in prior systems) to yield a flat fee for the account, the resulting blended fee may not reflect the actual level of transactions taking place or the services actually being provided for the account.

SUMMARY OF THE INVENTION

The present invention is a method for doing business by a financial services firm providing a traditional brokerage account that includes commission-free transaction processing, investment advice and services for a flat fee that remains in effect for a predetermined period of time, typically one year. The invention concerns a method for selecting appropriate clients and providing virtually unlimited commission-free trading across all asset classes with a compensation component for the financial advisor servicing the account that encourages the establishment of an appropriate annual fee. It should be understood that although the invention is described herein in terms of an annual fee, the period of time for which the fee is effective could vary, i.e., it could be more or less than a year, and that the fee could be structured to cover a defined level of services. One of the important concepts, however, is that the fee is not directly linked to a particular class or classes of assets.

The selection of appropriate clients is accomplished through a complex set of criteria designed to identify clients who would benefit from the invention by virtue of their investment portfolio and their investment personality. Investment personality is a term defined to encompass the preferences of the client. These preferences include the client's investment objectives and the need for transactions, advice and services required to meet those objectives.

The establishment of an appropriate fee is accomplished by a process that includes a review and assessment of the client's investment objectives, investment portfolio, past trading activity and service requirements, and those expected in the future. This information is gathered by the method and system of this invention and processed to arrive at a recommended fee to present to the client. The recommended fee may then be adjusted upward or downward within a wide range, based on further discussions between the financial advisor and the client. Should the fee be adjusted below a certain level, at which the difference between the fee and the account's transaction and service requirements do not meet the firm's profitability requirements, the invention includes an adjustment of, or a charge back to, the financial advisor's compensation. As a result, the financial advisor has a much broader range within which to price the relationship than would otherwise be possible without the compensation adjustment.

One of the novelties in this invention resides in part on this feedback to the financial advisor's compensation, making him or her responsible for the maintenance of the balance between client assets, fees assessed, transactions and services provided and firm profitability.

DETAILED DESCRIPTION OF THE INVENTION

Figure 1:
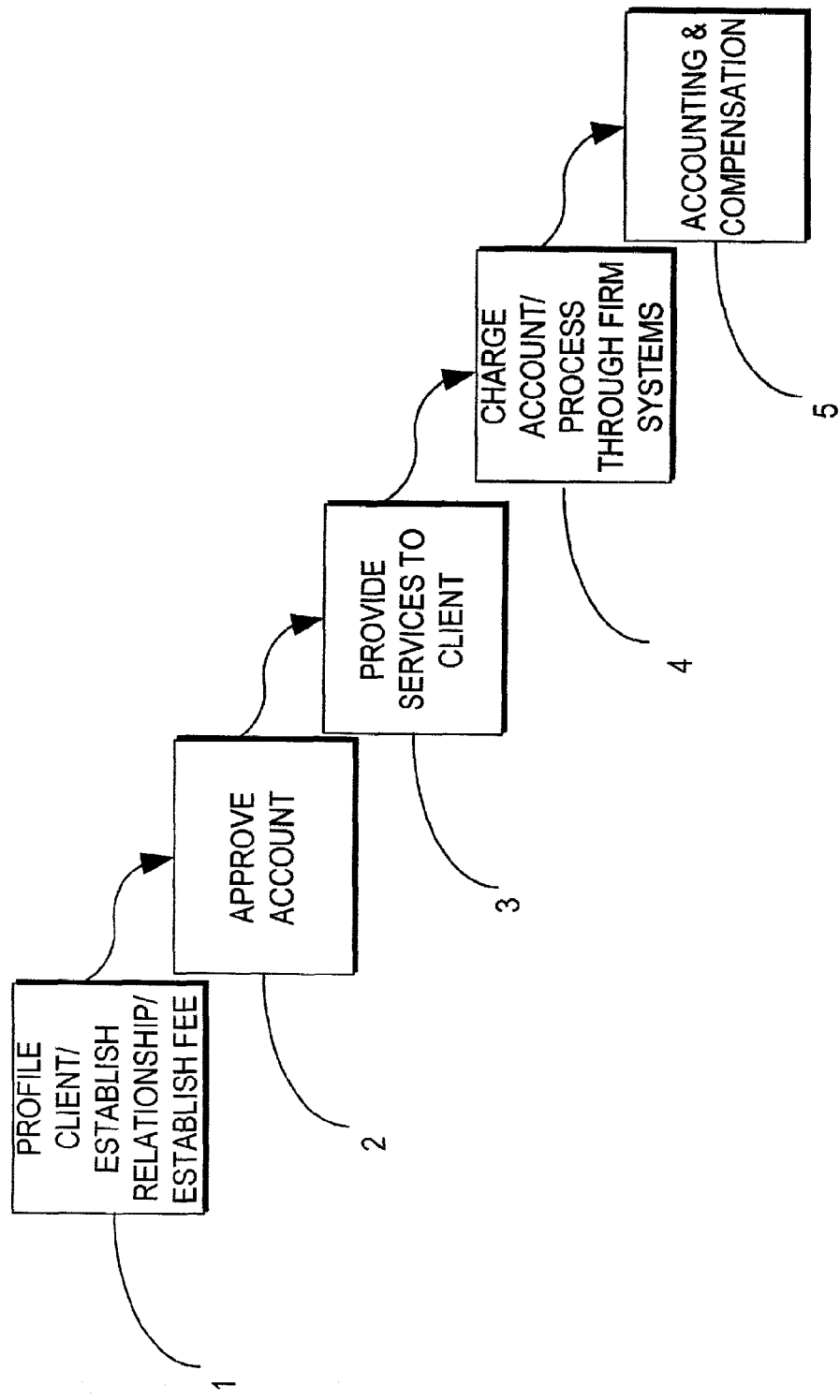
FIG. 1 depicts the overall procedure of this invention for establishing a new brokerage account for a client.

The overall procedure for establishing a new flat fee brokerage account for a client is shown in FIG. 1. Initially, a profile of the client is established at step 1 by requesting the client to respond to a questionnaire. On the basis of this profile, including information such as client investment objectives, client risk tolerance, client assets with a description of asset allocation, types of trades, and profitability ranking parameters, a recommended fee is established for discussion with the client, using an algorithmic evaluation. The final flat fee is the result of negotiations between the financial advisor and the client. A determination is made at step 2 whether to approve the account. If approved, services are provided to the client at step 3. The charges incurred by the account are then processed in step 4 and proper accounting and compensation of the responsible financial advisor is provided at step 5.

Compensation of the financial advisor may require that the financial advisor be charged a specific dollar amount for each transaction, subject to the fee level of the account, the total revenue derived from the client relationship and other information that may be processed through an algorithm, resulting in different types of financial advisor compensation adjustments. Subject to the profitability characteristics of the account, the method and system may assess a transaction charge to the financial advisor and/or adjust the financial advisor's level of compensation. For example, a $10-$20 charge may be assessed to the financial advisor for each non-fixed income transaction if the negotiated fee is below a certain level (e.g., less than 75 basis points (0.75%)), and the revenue generated from the relationship with all of the client's accounts of eligible assets is below a certain dollar threshold (e.g. less than $2,500 per quarter). Subject to the actual fee associated with an account and the actual total revenue associated with the relationship, the $10 to $20 charge may be increased or decreased, and may be applied or waived for different types of transactions. Additionally, the financial advisor's compensation level (i.e., the percentage of client's flat fee that is paid to the advisor) may also be reduced by these factors, with or without the transaction assessment, subject to the profitability characterization of the account and of the relationship.

Figure 2:
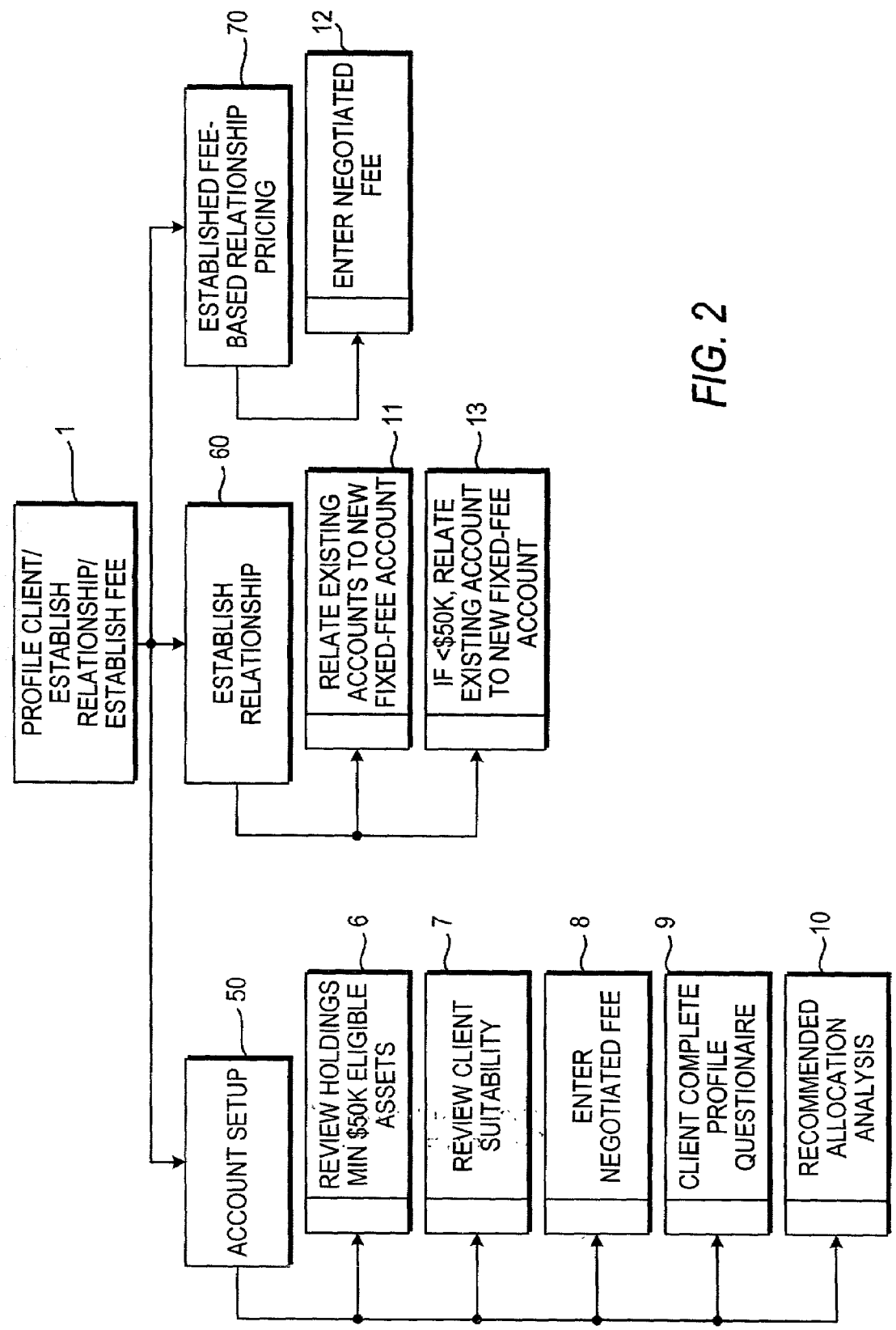
FIG. 2 depicts the stages of this invention to be undertaken by a financial advisor in the determination of the relationship of the client account to other accounts for the client held by the firm and for establishing a negotiated fee-based relationship with the client.

FIG. 2 depicts the stages to be undertaken by a financial advisor in creating a client profile and establishing the relationship of the client account to other accounts of the client held by the firm, and for establishing an appropriate fee-based relationship with the client (Box 1). In particular, to set up the account (Box 50), holdings of the client are reviewed (Box 6) and a minimum holding size, for example $50,000 of eligible assets, is required. The client's objectives and sophistication are reviewed to determine suitability (Box 7). A flat fee is then established to encompass essentially all trading activity and other account services (Box 8), as described in further detail herein below in connection with FIG. 10. In a preferred embodiment, a questionnaire will be provided to the client (Box 9). The questionnaire examines the client's investment objectives, investing time frame, return and risk profile, and asset allocation guidelines.

The client's investment objectives include client goals, such as preservation of capital, asset growth with or better than inflation, current income, or asset appreciation.

The investing time frame details the time period at which the funds are to be invested. The return and risk profile defines the client's tolerance to a risk in pursuit of the returns of the investment. The returns are achieved by long-term investment through tolerance to short-term fluctuations of the value of the investment.

The asset allocation guidelines are indicators of the client's desired distribution of assets to certain investment classes. The allocation guidelines also contain the relative portion of assets to be invested in the new flat fee brokerage account with respect to the client's total assets.

The questionnaire becomes the basis for a discussion to determine applicability of the new flat fee brokerage account to the client's objectives. The financial advisor and the client discuss the client's investment objectives, risk tolerance, and existing asset allocation, to analyze and provide a recommended asset allocation (Box 10). For a previously existing client, for whom much of the information is already available, the process may be shortened by relating the client's existing accounts to the present invention. In such a case, nothing more may be required than establishing a negotiated fee for the new relationship (Box 12).

Once the account set up process (Box 50) is completed for a new client or for a previously existing client, the flat fee brokerage account can be related to other accounts of the client at the firm in order to take advantage of the flat fee aspect of the new brokerage account (Box 60).

The new flat fee brokerage account may require minimum asset levels (for example $50,000). If the new flat fee brokerage account is being established with asset levels less than the required minimum asset level ($50,000), a new client must establish other accounts with the firm or an existing client must identify existing accounts at the firm. The existing accounts or newly established accounts are then related (Boxes 11 and 13) to the new flat fee brokerage account established pursuant to this invention in order to take advantage of the flat fee aspect of the account and to surpass the minimum asset requirement level.

Upon establishment of the new flat fee brokerage account with the appropriate account relationships (Box 60), the financial advisor and the client may negotiate to establish a relationship based fee (Box 70) for the new flat fee brokerage account and the related accounts. The fee includes a minimum account fee, and defines a term or duration for the account. For instance, the new flat fee brokerage account may have a term of one year, with a specific maximum number of transactions included in the fee at a specific asset level. Upon completion of the negotiation of the flat fee amount and the term, the negotiated flat fee is recorded (Box 12).

Figure 3:
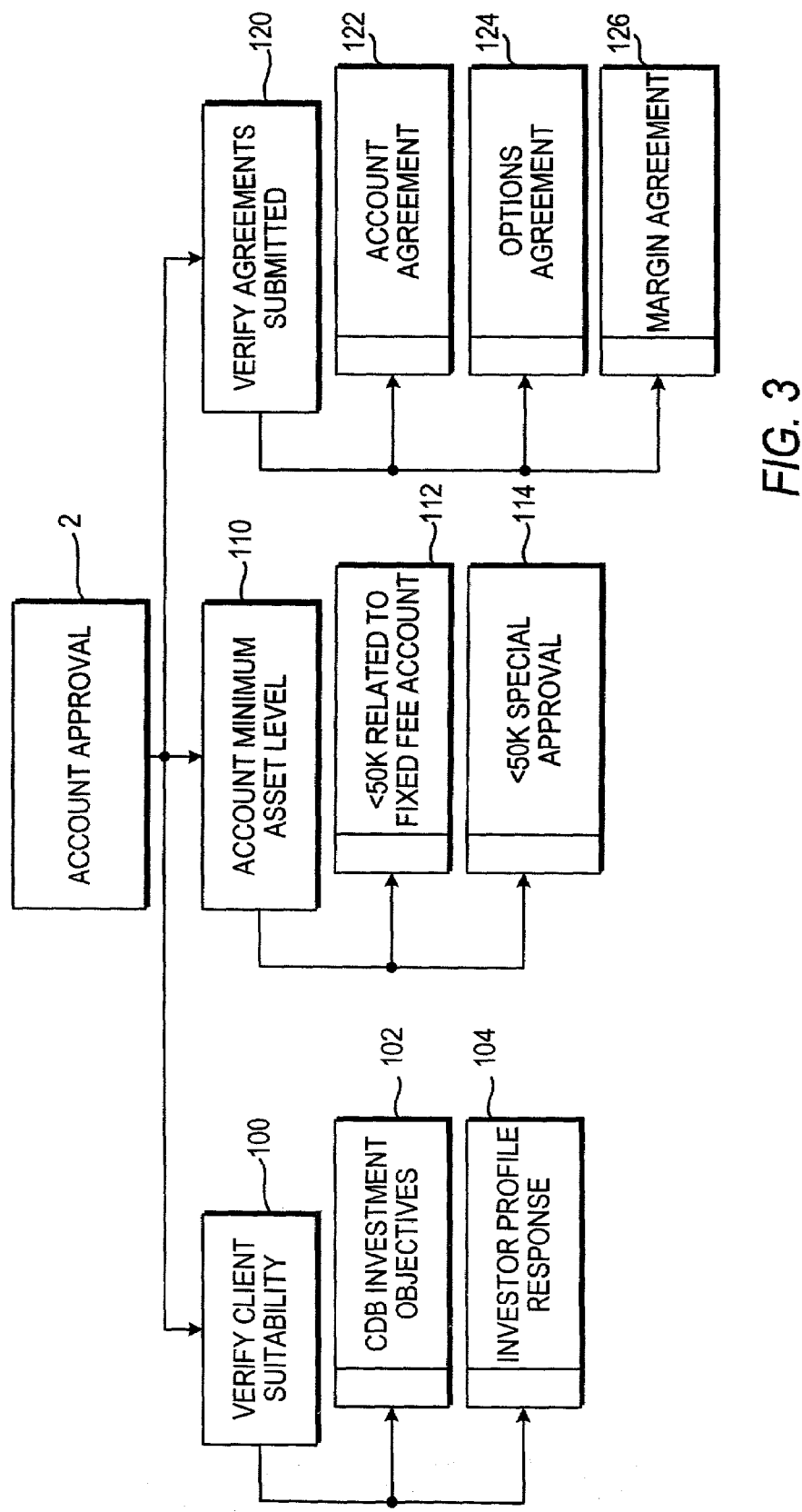
FIG. 3 depicts the stages for approving a client application for the new flat fee brokerage account.

Referring now to FIG. 3, the procedures involved in the step of account approval (Box 2) will now be discussed. Once a financial advisor has established the client relationship and negotiated the fee of the new flat fee brokerage account pursuant to this invention, the documentation is transferred to a brokerage operations manager for approval (not shown). The brokerage operations manager must verify client suitability (Box 100). For an existing client, the brokerage operations manager inspects the client account database (Box 102) to review the client's transaction history, income, financial resources and previously recorded investment objectives to insure suitability. However, for a new client, the brokerage operations manager reviews (Box 104) the client's responses on the account agreement (Box 122) and the questionnaire that established the client's investment objectives and desired asset allocation, with emphasis on the new flat fee brokerage account's position in the client's total asset allocation.

The brokerage operations manager then reviews (Box 110) the assets being deposited into the new flat fee brokerage account. If the amount of assets being deposited to the new flat fee brokerage account is less than the required minimum asset level ($50,000), the brokerage operations manager reviews any related accounts of the client to insure that the minimum asset level is met or exceeded in the aggregate. If the minimum asset level is not either being deposited to the new flat fee brokerage account or found in the related account(s), the brokerage operations manager must seek (Box 114) special approval to open the new client account.

To complete the account approval procedure (Box 2), the brokerage operations manager must verify (Box 120) the terms of any agreement documents submitted.

The account agreement (Box 122) details the duration of the flat fee for the new flat fee brokerage account, the initial asset level, and any existing accounts to be related to the new flat fee brokerage account established pursuant to this invention. For a new client, the account agreement details the client's income, net worth, investment experience and investment objectives. The options agreement (Box 124) defines the types and terms of any options trading allowed in the account, and the margin agreement (Box 126) defines the terms of any investment transactions through the new flat fee brokerage account that are to be executed "on margin".

Figure 4:
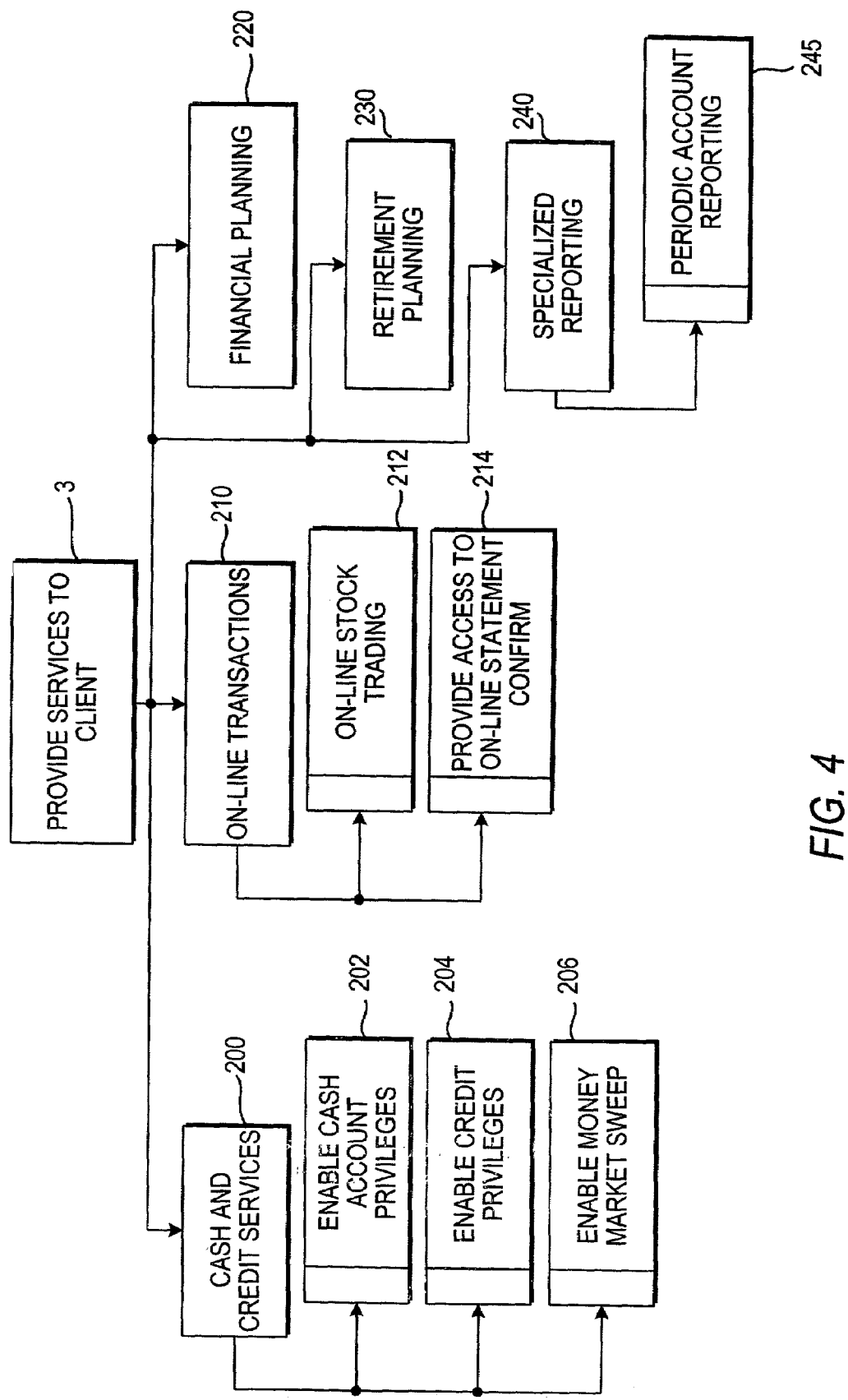
FIG. 4 illustrates the services provided by the new flat fee brokerage account of this invention.

Upon account approval (Box 2), the firm can then provide to the client the services associated with the new flat fee brokerage account, as shown at step 3 in FIG. 1, and illustrated in further detail in FIG. 4. The services provided by the new flat fee brokerage account may include cash and credit services (Box 200), on-line transactions (Box 210), financial planning (Box 220), retirement planning (Box 230), and special account status reports (Box 240).

The cash and credit services (Box 200) may include cash accounts (Box 202) as a checking account, money market account, or savings account, credit privileges (Box 204) such as a credit card, and a money market sweep (Box 206), which places any excess cash funds in an interest bearing money market account automatically.

The on-line transactions (Box 210) allow the client to have access to the new flat fee brokerage account through data communication media such as the Internet. This allows the client to institute trading of stocks and other investment vehicles (Box 212) without direct communication with a financial advisor. Any such on-line trading is confirmed with on-line access to account statements (Box 214). Also, the client can pay bills or move money between accounts directly though this on-line service (not shown).

The financial planning (Box 220) and retirement planning (Box 230) allow the client to avail himself or herself of expert assistance to review his or her investment objectives and asset allocations to meet specific short term financial goals (e.g., buying a house) or longer term financial goals such as saving for a child's education or for retirement. The specialized reporting (Box 240) provides periodic account reports (Box 245), which not only itemize the asset values and transactions for a period (monthly, quarterly, annually), but also provide realized and unrealized investment gains and/or losses.

Figure 5:
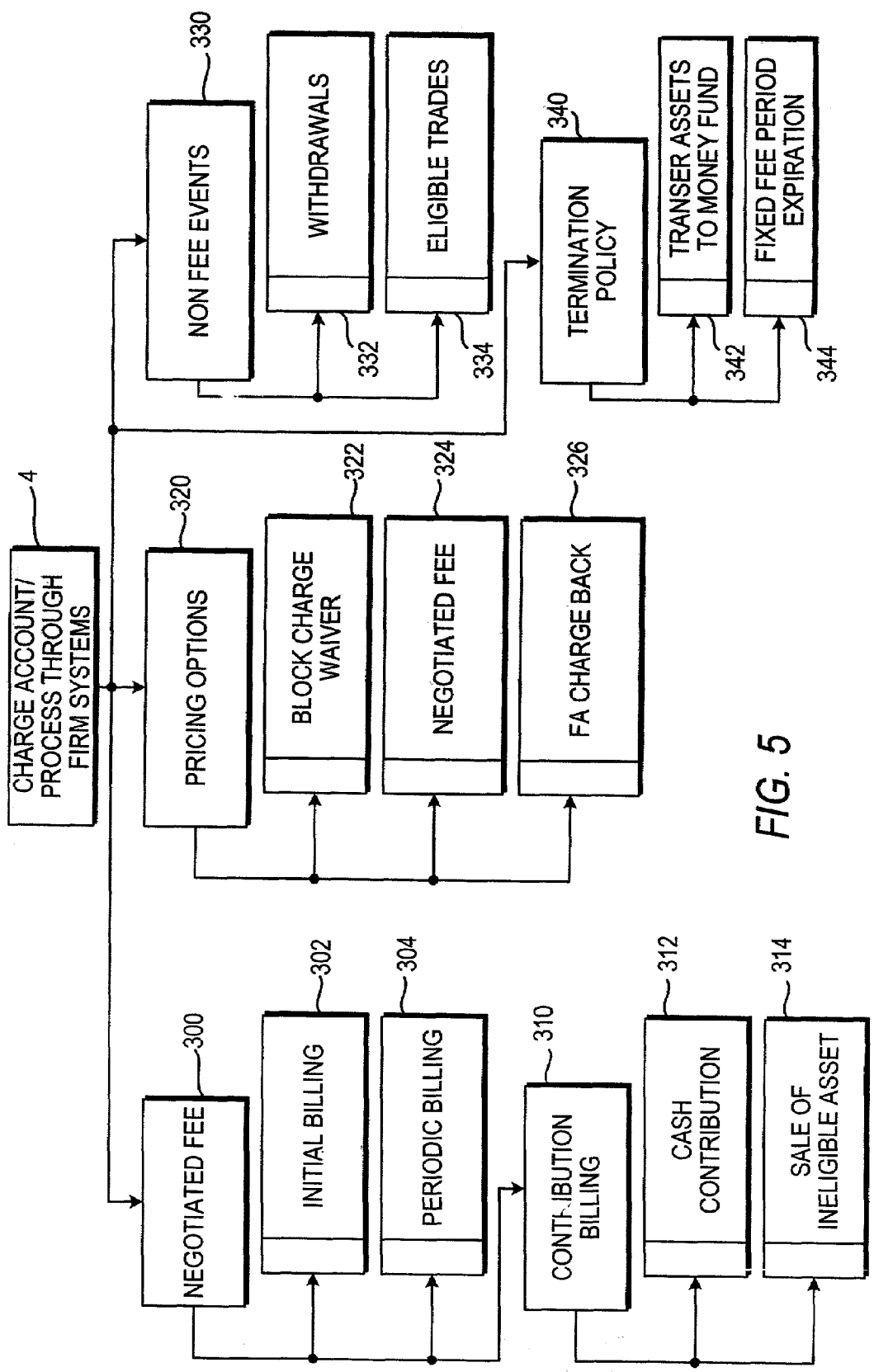
FIG. 5 portrays the accounting process for the new flat fee brokerage account.

The charges incurred by the client that pertain to the new flat fee brokerage account are processed through the financial services firm's account system (step 4 of FIG. 1) as detailed in FIG. 5. Based upon the negotiated fee (Box 300), established as described above, the accounting system creates the initial billing (Box 302) and the quarterly (Box 304) billing. The accounting system then creates the contribution billing (Box 310) for which the client is responsible. The contribution billing includes fees incurred for the deposit of additional assets into the new flat fee brokerage account (Box 312), after initial or quarterly billing is completed, and the fees incurred by the sale through the new flat fee brokerage account of assets ineligible under the terms and conditions of the new flat fee brokerage account (Box 314).

The firm's account system will further process any transactions that do not incur any fees (Box 330). The non-fee transactions may include any withdrawals from the cash accounts (Box 332) or any eligible trades as permitted under the terms of the new flat fee brokerage account (Box 334).

Certain pricing options for transactions through the new flat fee brokerage account (Box 320) are also processed by the firm's account system. For certain types and sizes of transactions handled as a unit or block, an additional fee may be charged. Block charges may be waived at an account level (Box 322). Once the new brokerage account is established and approved, the negotiated flat fee must be recorded and processed in the firm's systems (Box 324).

A fee is charged back to the financial advisor (Box 326) when an account does not meet a certain level of profitability. This charge back is discussed more completely hereinafter.

If one of the new flat fee brokerage accounts is to be terminated, the firm's account system must process the termination according to the firm's termination policy (Box 340). The non-cash assets can be liquidated and the cash deposited to a money fund or cash account (Box 342). This termination may occur at the expiration of the term or period of the new flat fee brokerage account (Box 344). If the termination occurs before the negotiated term, the client will be charged a termination fee (not shown).

Figure 6:
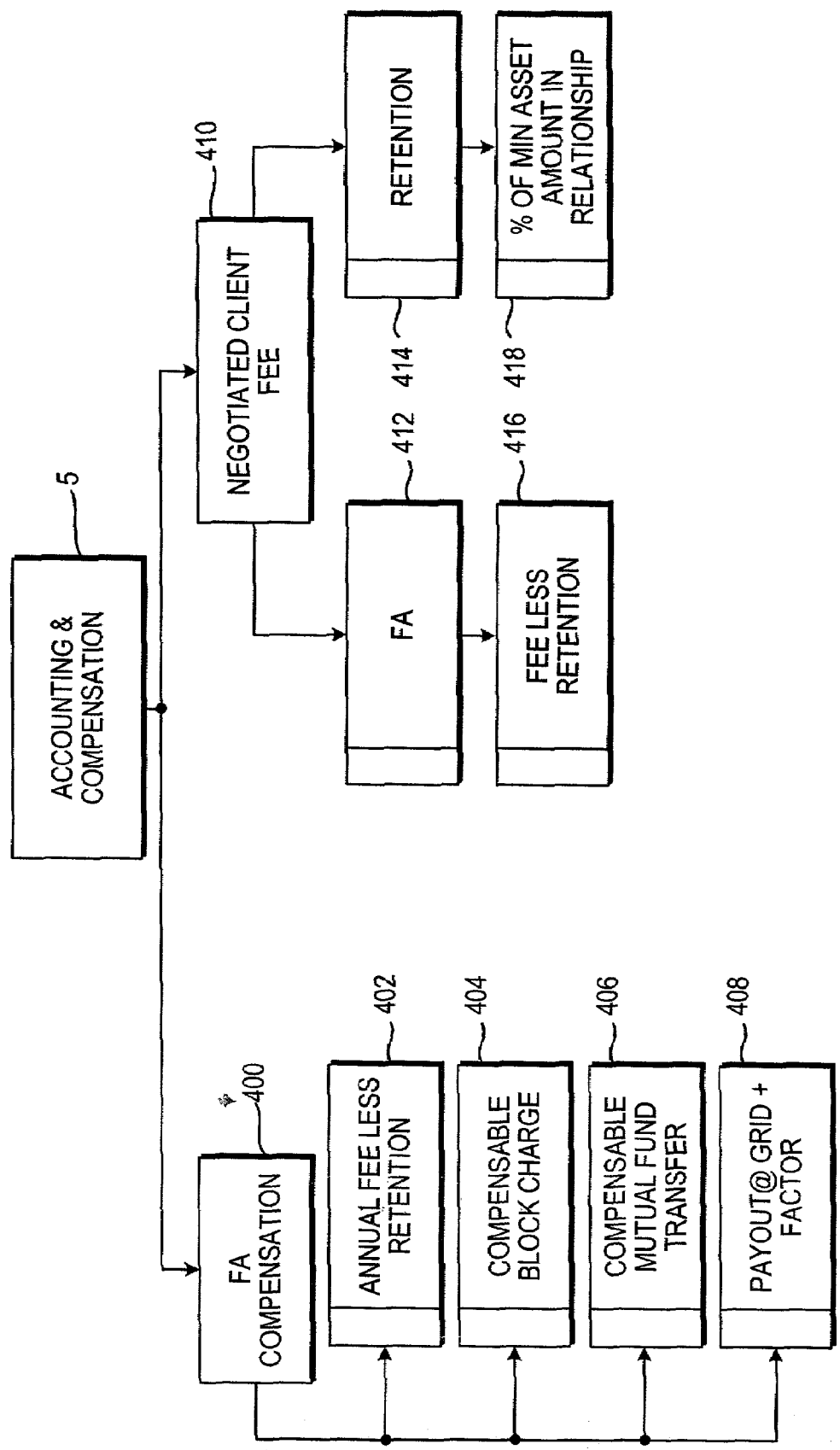
FIG. 6 represents the compensation process for the new flat fee brokerage account.

Subsequent to the processing and billing of the client's charges (step 4 in FIG. 1), the accounting takes place and appropriate compensation is provided to the responsible financial advisor as shown at step 5 in FIG. 1 and illustrated in further detail in FIG. 6. The accounting and compensation step begins with the determination of the financial advisor's compensation (Box 400). The components of the financial advisor's compensation include the negotiated annual fee for the new flat fee brokerage account (Box 402), from which a retention factor is deducted as part of the firm's revenue. Any non-waived charges for block transactions are also payable to the financial advisor (Box 404), as are fees from excessive mutual funds transfers (Box 406). The financial advisor will receive a portion of these fees and charges based on his or her compensation level, computed according to a standard commission grid, and which may thereafter be adjusted based upon performance factors (Box 408).

The accounting and compensation step continues with the negotiated client fee (Box 410) being divided into the portion of the fee payable to the financial advisor (Box 412) and the retention factor or amount retained by the firm (Box 414). This portion of the fee is the negotiated client fee less a minimum retention factor (Box 416). The retention factor is generally a percentage or a number of basis points of the total assets in the new flat fee brokerage account or related to the new flat fee brokerage account (Box 418). For example, the retention factor may be 10 bps or 0.10% of all such assets.

Figure 7A:
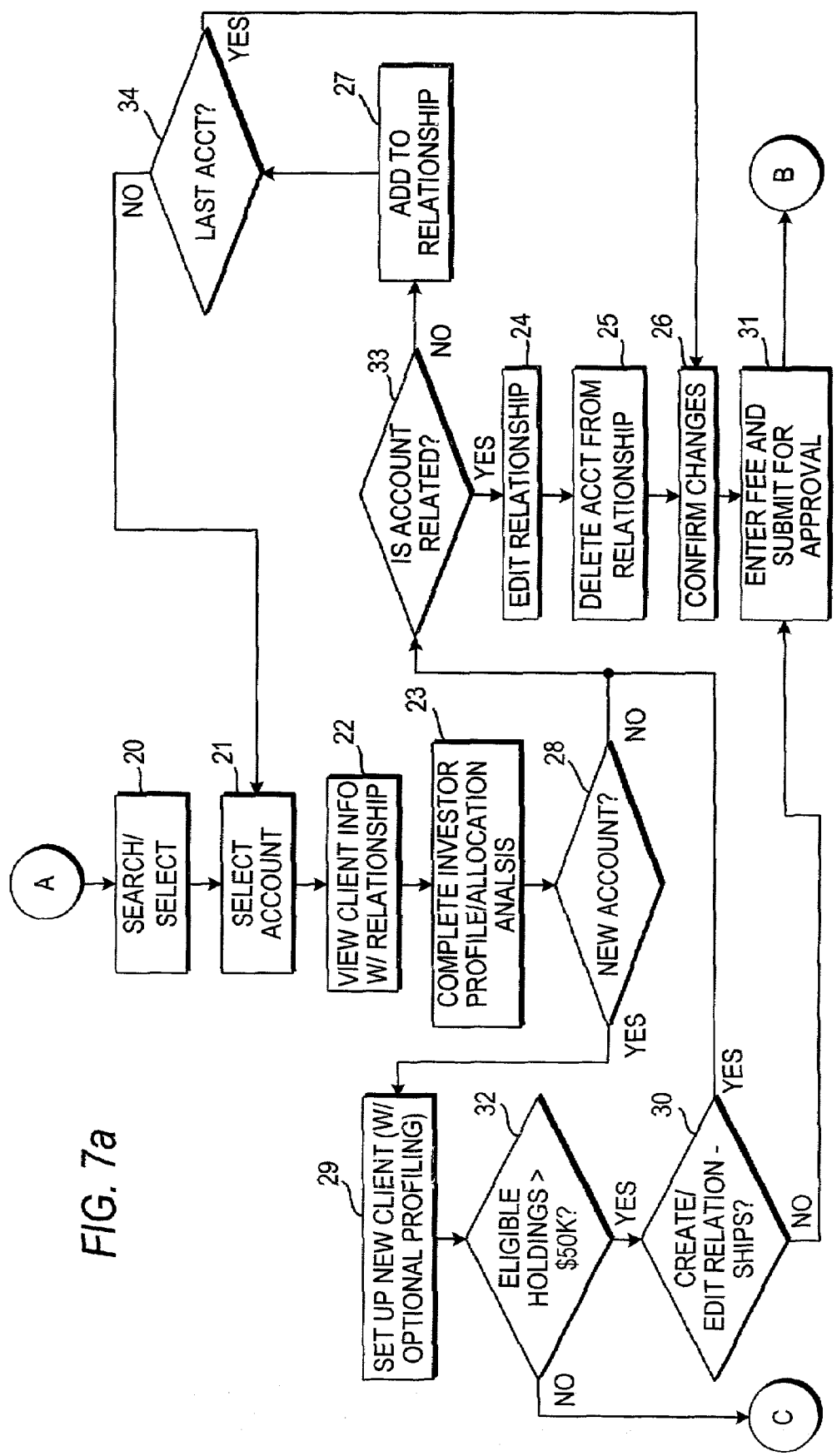
FIG. 7a shows in more detail the steps to be taken by the financial advisor in setting up a flat fee brokerage account.
Figure 7B:
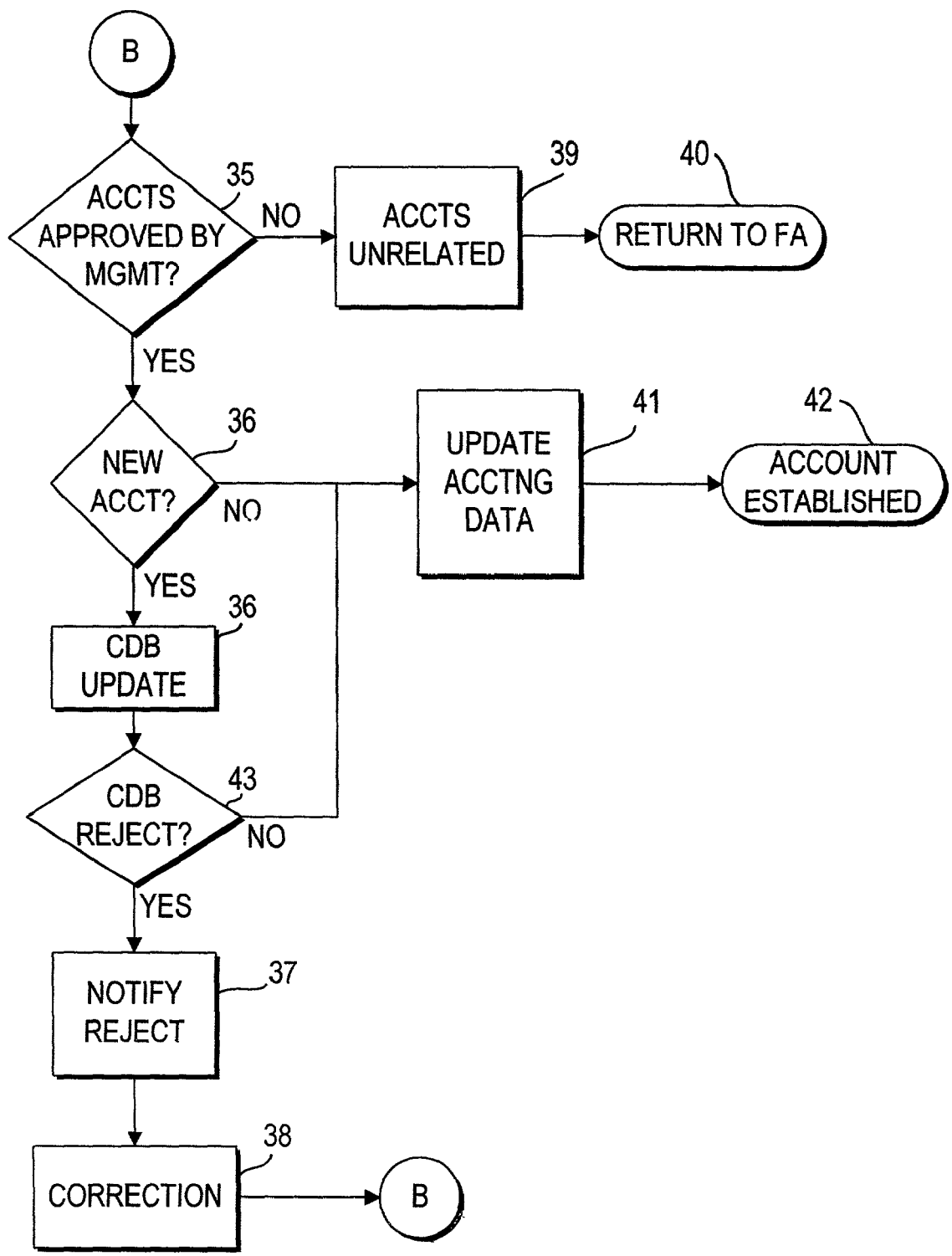
FIG. 7b shows the steps of the method involved in approving the account using the brokerage computer system of this invention.
Figure 7C:
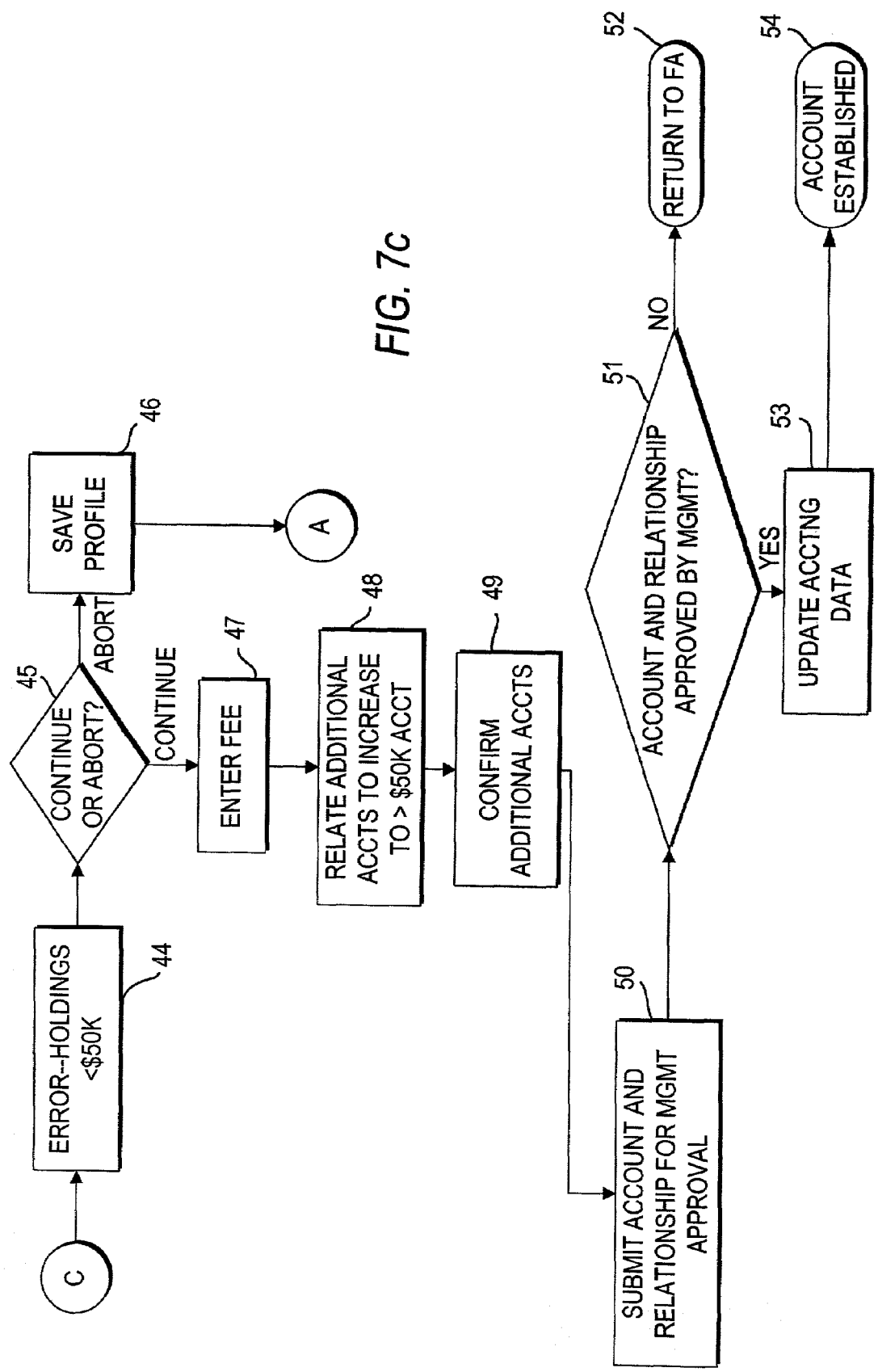
FIG. 7c shows the steps of the method for accounts that are technically below the minimum portfolio size of eligible investments.

FIGS. 7a-7c show in more detail the steps to be taken by the financial advisor in setting up a flat fee brokerage account in accordance with the invention. As depicted in FIG. 7a, the appropriate account information stored on a computer database (not shown) is accessed typically over a network link to a particular workstation. At the workstation an account search is initiated at step 20, and the appropriate account is selected at step 21. The client information is viewed, and a profile is constructed for the client at step 23. The investor profile and asset allocation analysis is optionally entered with the new account information. The client information is then tested at step 28 to determine whether the client is new. The account information is then tested at step 33 for any relationship to a flat fee brokerage account established previously in accordance with this invention. If the existing account is already related to another flat fee brokerage account, the relationship may be modified at step 24, and the related account may be deleted at step 25, after which the changes are confirmed at step 26. If the existing account is not already related to a flat fee brokerage account, then the relationship may be established and existing accounts may be incorporated into the relationship at step 27, or alternatively accounts may be selected from an existing relationship. At step 34, the financial advisor tests whether the last account has been appropriately related. If not, the process returns to step 21 where a new account is selected and processing continues. If all accounts have been related, these changes are confirmed at step 26 and the negotiated fee is entered at step 31, after which the new account is submitted for approval.

If the client is new, however, a new account is set up at step 29 for the client. The new account is tested at step 32 to verify that the minimum asset level ($50,000) either is being deposited into, or is available for relating to, the new brokerage account. If the eligible holding is greater than the minimum asset level, the financial advisor is queried at step 30 to determine whether there are relationships to be created or edited. If there are other accounts to be related to the new brokerage account, the process continues at step 33 and new relationships are added as described above. On the other hand, if no relationships are to be created or edited, the fee is entered at step 31, after which the new account is submitted for approval.

As shown in FIG. 7b, upon entry of the negotiated fee at step 31, the new account is reviewed, as described previously in connection with FIG. 3. First, the new brokerage account application is queried for approval at step 35. If the new brokerage account is not approved by the brokerage operations manager, then the new brokerage account is unrelated from the other flat fee brokerage accounts at step 39 and the application is returned to the financial advisor at step 40.

However, if the application for the new brokerage account is approved by the brokerage operations manager, the brokerage system is interrogated at step 36 to verify whether the application for the new brokerage account is a newly opened account or an existing account being converted. If the new brokerage account is an existing account being converted, the brokerage accounting data is updated at step 41, and the account is thereafter established at step 42 for the client's use and the relationship is established with the other flat fee brokerage accounts. If the new brokerage account is a newly established account (rather than a conversion of an existing account), the client database is updated at step 37 and the new brokerage account is reviewed at step 43 to ensure that the relationship is valid (i.e., that all new accounts in the relationship have been approved). If the relationship is validated, then the brokerage accounting data is updated at step 41, and the account is thereafter established at step 42 for use by the client. However, if the relationship is deemed invalid (i.e., not all accounts have been approved) and is thus rejected by the client database, then the brokerage operations manager is notified at step 37 and is offered an opportunity to correct the account relationship at step 38. Upon correction, the process returns to step 35 and the account relationship can be approved by the brokerage operations manager, after which the process is repeated as described above.

Referring again to FIG. 7a, if at step 32 the eligible assets attributed to the account are found to be less than the predetermined minimum asset level (e.g., $50,000), an error is declared, as shown at step 44 in FIG. 7c. The financial advisor is then queried at step 45 whether the application for the new brokerage account is to be aborted or continued. If the application is to be aborted, the profile is saved at step 46, and the process returns to step 20 in FIG. 7a where a new application is selected for processing.

However, if the processing of the application is to continue despite the error, then the negotiated fee is entered at step 47, and the existing accounts of the client are related to the new brokerage account at step 48 such that the combined assets of the new brokerage account and the newly related accounts exceed the predetermined minimum asset level. The balances of the newly related accounts are confirmed at step 49, and the application for the new brokerage account together with the new account relationships, is submitted to the brokerage operations manager for approval at step 50. The brokerage operations manager reviews the application (as described previously in connection with FIG. 3), and if the application is not approved in step 51, the application is returned to the financial advisor at step 52 for review, revision and potential resubmission. On the other hand, if the account is approved by the brokerage operations manager, the accounting data is updated at step 53, and the account is thereafter established at step 54 for client use.

Figure 8:
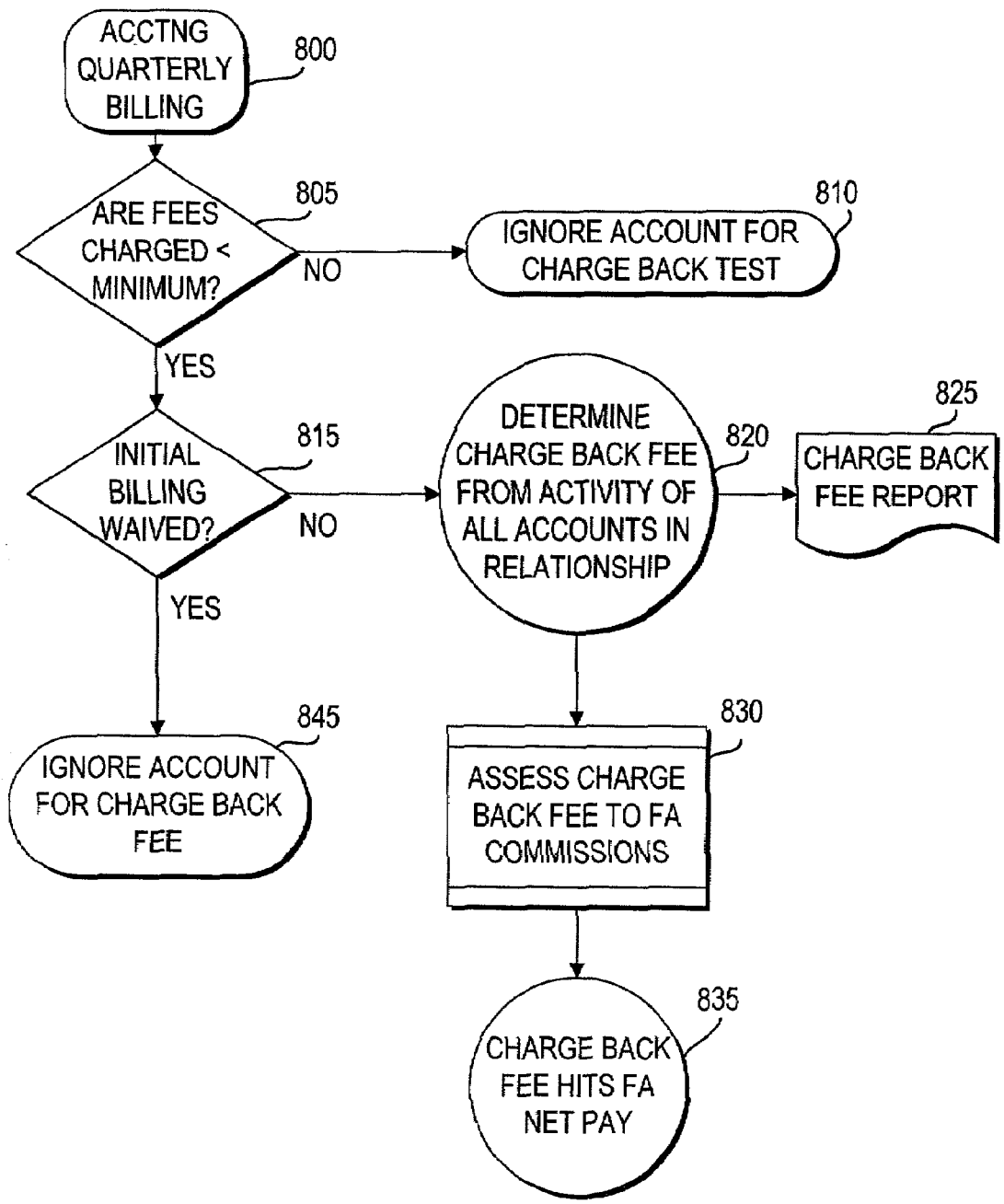
FIG. 8 is a flow chart showing the financial advisor's charge flow where typical charges are $14 per transaction.

An important aspect of this invention is that the levels of transactional activity in the new brokerage account, such as the purchase and sale of stock, are monitored to insure that they meet certain levels. If the new brokerage account does not meet the activity levels as agreed upon during the negotiation of the fee, the compensation of the financial advisor is adjusted or the client fee may be renegotiated by the financial advisor. Referring now to FIG. 8, the determination of this adjustment or "charge back fee" is illustrated.

At the end of each calendar quarter, the firm's accounting computer processor generates at step 800 a billing report summarizing the activity and the fees for the new brokerage account and its related accounts. The fees being charged are compared at step 805 to a predetermined minimum fee amount, for example 75 bps (0.75%) of the asset value. If the fees being charged are equal to or exceed the predetermined minimum fee level, then no charge back fee is assessed against to the financial advisor at step 810, and the fees are charged to the client. However, if the predetermined minimum fee level exceeds the fees being charged, then a determination is made at step 815 whether the charge back to the financial advisor has been waived. If it has been waived, then no charge back fee is assessed against the financial advisor at step 845. However, if the charge back has not been waived, then the amount of the charge back is determined at step 820 as a function of the combined transactional activity levels of the new brokerage account and the fee revenue generated from the relationship. A charge back report for each financial advisor is then generated at step 825, and at the same time the charge back amount is assessed against the commissions of the financial advisor at step 830, is ultimately deducted from the net compensation of the financial advisor at step 835. Thus, the charge back system encourages the financial advisor to review the objectives and goals of a client having a new brokerage account established in accordance with this invention, to insure that these objectives and goals are appropriate for the client.

Figure 9:
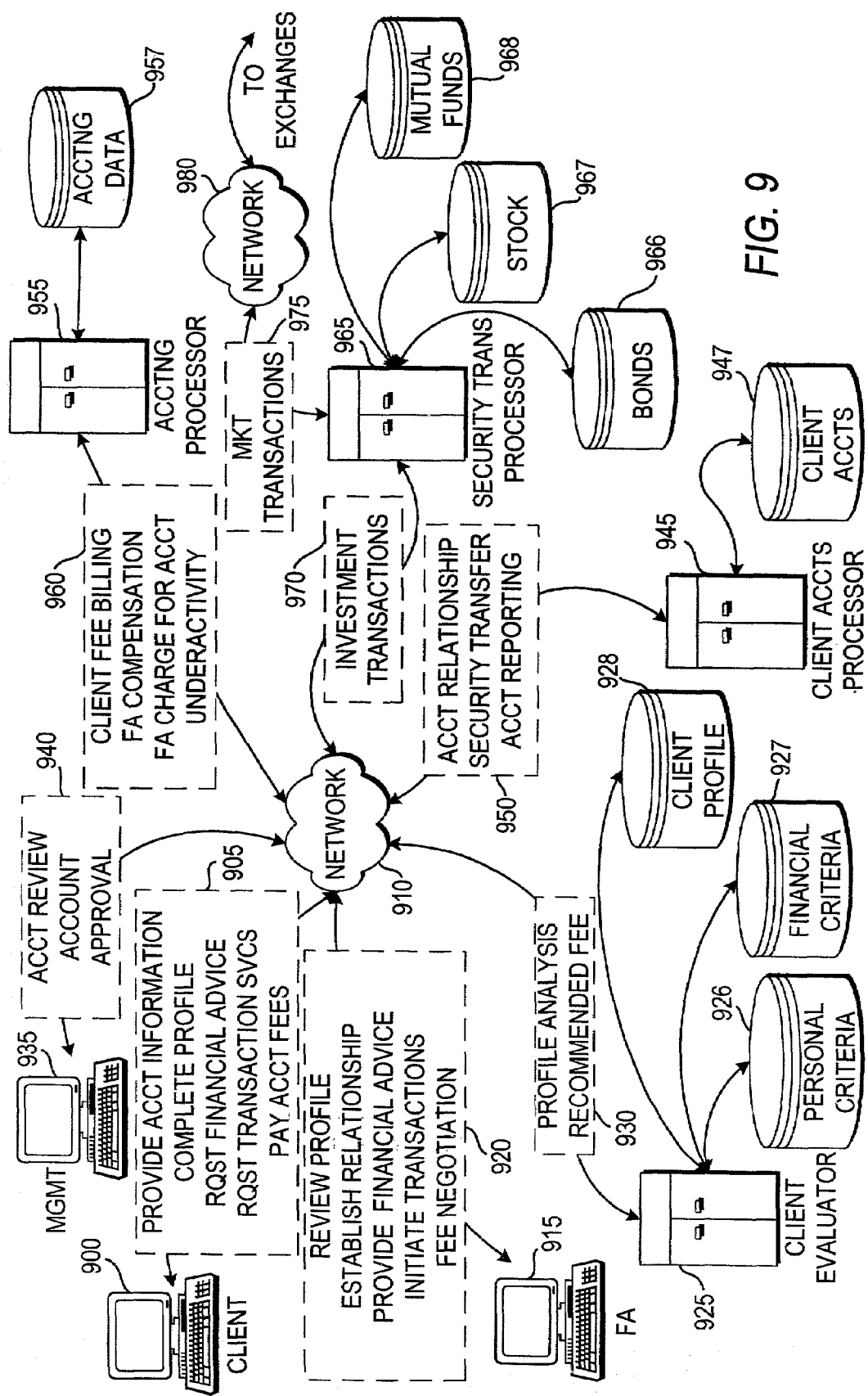
FIG. 9 is a schematic diagram of a networked brokerage computer system of this invention.

The present invention may be implemented as a system of computer programs running on a networked computer system, as shown in FIG. 9. Preferably a client is able to communicate with the networked computer system through the client interface terminal 900. The client terminal 900 may be a personal computer with a modem, an internet appliance, or other device capable of being connected to and capable of communicating through the financial firm's network 910.

The network 910 may be a public digital communications network such as the internet, or a private network within the financial firm. If the network 910 is a private network, the client should be able to access the network 910 remotely, despite any so called "fire wall" protection (not shown) which may be implemented on the network.

The financial advisor is also able to communicate with the networked computer system, through the financial advisor interface terminal 915. The financial advisor interface terminal 915 is also connected so as to communicate with the network 910. As with the client terminal 900, the financial advisor interface terminal may be a personal computer, an internet appliance, or other device capable of communicating with the network 910. The financial advisor terminal 915 may also be at a remote location, and thus must also be able to access the network through the "fire wall". Alternatively, the financial advisor terminal 915 may be directly connected to the network 910.

Although not shown in FIG. 9, it should be understood that if is also possible to implement the invention without a client terminal 900. In this case, the client may be in direct communication with the financial advisor (e.g., in person or via the telephone), and the information and data provided by the client may be entered through the financial advisor interface terminal 915.

The networked computer system also includes a brokerage operations manager interface terminal 935 which is connected do so as to communicate with the network 910. The brokerage operations management interface terminal 935 may be a personal computer or computer workstation connected directly to the network 910, or, if the brokerage operations manager is operating from a remote sales office, then the brokerage operations management interface terminal 935 may be connected remotely through a public data communications network and must also be able to access the "fire wall" to the network 910 despite the "fire wall".

The networked computer system further includes an accounting computer processor 955 connected so as to communicate with the network 910. The accounting computer processor 955 also communicates with a storage medium 957, such as a magnetic disk, that retains an accounting database. The accounting database contains records of the payable accounts, such as financial advisor compensation, and receivable accounts, such as the negotiated client fees and the financial advisor charge back fees.

The networked computer system further includes a client accounts computer processor 945 connected so as to communicate with the network 910. The client accounts computer processor 945 also communicates with a storage medium 947 that retains the client accounts database. The client accounts database includes for each client, the assets deposited to each account maintained by the client, the value of the assets, and a history of the sales transactions and purchase transactions within each account.

The networked computer system also includes a security transaction computer processor 965, which is connected so as to communicate with both the financial firm's network 910 and to a public or other private stock exchange network 980. The security transaction computer processor 965 maintains access for the financial firm through the stock exchange network 980 to any desired stock exchange to facilitate sales, purchases, and trades of assets such as securities (e.g., stocks) and other investments (such as bonds and mutual funds).

The security transaction computer processor 965 thus also communicates with storage media 966, 967 and 968, containing records of the sales, purchases, and trades of stocks, bonds and mutual funds, respectively. Further, if the financial firm maintains a market for any of these types of assets (stocks, bonds, mutual funds) the relevant information is recorded in the databases retained on the storage media 966, 967 and 968, respectively, as well.

The networked computer system further includes a client evaluator computer 925 connected so as to communicate with the network 910. The client evaluator computer 925 maintains databases for storing each client's personal criteria data, such as risk tolerance, each client's financial criteria data, such as trading activities, and each client's personal profile data, on storage media 926, 927 and 927, respectively, with each of which the client evaluator computer 925 communicates.

The operation of the networked computer system will now be described. A client and a financial advisor make contact to discuss the client's investment objectives and assets available for investment (not shown), and the financial advisor may suggest the suitability of a new brokerage account in accordance with this invention. As shown at 905 in FIG. 9, the client provides information regarding any existing accounts he or she already has with the financial firm. The client also provides or completes a client profile, as described above.

The client profile, along with the associated asset information, is then placed in the client profile database 928. The client evaluator computer 925 thereafter retrieves the client profile with the associated asset information from the client profile database 928, and the information is transferred to the financial advisor through the financial advisor interface terminal 915. Based on the personal investment criteria such as the risk tolerance and investment horizon, the client evaluator computer also provides a profile analysis and a recommended flat fee 930 to the financial advisor through the financial advisor interface terminal 915.

As shown at 920 in FIG. 9, the financial advisor then reviews the profile analysis with the client and negotiates the fee for the new brokerage account. The financial advisor also initiates the appropriate documentation to create the account, enters the fee and establishes the relationships, as necessary, between the new brokerage account and any existing client brokerage accounts.

The information needed for management approval (as described above in connection with FIG. 3) is then transferred from the financial advisor through the financial advisor interface terminal 915 and the network 910, to the brokerage operations manager interface terminal 935, for application review and approval as shown at 940.

Upon approval of the new flat fee brokerage account for the client, the account information, including the associated relationships (if any), is transferred to the client accounts computer processor 945 for storage in the client accounts database on storage medium 947. The account information is also transferred to the accounting computer processor 955 for creation and storage of the flat fee account within the accounting database on storage medium 957. As shown at 960, the accounting computer processor generates an initial client fee billing, and any subsequent periodic billings, associated with the new flat fee brokerage account, and transfers them through the network 910 to the client interface terminal 900 and then to the client for payment as indicated at 905 in FIG. 9. With the establishment of the new brokerage account, the client also has access through the client interface terminal 900 to request financial advice, such as financial planning and retirement planning, and to request transaction services, such as trading in (i.e., purchase and sales of) securities (e.g., stocks bonds and/or mutual funds), as well as checking account and credit card services, all as described previously in connection with FIG. 4.

As indicated at 920 in FIG. 9, the financial advisor provides the financial advice and can, upon consultation with the client, initiate any requested transactions for the purchase or sale of securities. The security transaction computer processor 965 receives the requests for security transactions (stock, bond or mutual fund purchase or sale), completes the transactions (as shown at 970), and transfers information concerning the affected securities to the client accounts computer processor the client accounts database on storage medium 947. The security transaction computer processor 965 also transfers information concerning the transactions to the accounting computer processor 955, which in turn updates the accounting database on storage medium 957 for an assessment of client fees (if any) and payment of financial advisor compensation as indicated at 960 in FIG. 9.

As indicated at 950 in FIG. 9, the client accounts computer processor 945 periodically (e.g., monthly, quarterly, or annually) or on demand, creates a status report of the client's accounts, indicating the assets in the account and the transactional activity levels of the accounts. The report is then transferred to the client and to the financial advisor, preferably through the client interface terminal 900 and the financial advisor interface terminal 915, respectively.

As indicated at 960 in FIG. 9, at certain predetermined time intervals the accounting computer processor 955 tabulates the transactions for each client account, and generates a financial advisor compensation report. If a client account does not meet the predetermined levels of transactional activity, the charge back fee as described previously in connection with FIG. 8 is deducted from the compensation of the financial advisor.

It should be apparent that the computer systems as described in FIG. 9 may be consolidated into a single computer processor, or distributed such that the functional processors reside on many computing systems. Further, the methods and systems of the present invention can be implemented as a program code for execution on a computer system. The program code is stored on media such as the permanent memory of the computer system (not shown) or stored within storage nodes (not shown) of a network accessible by both the client and financial advisor.

Figure 10:
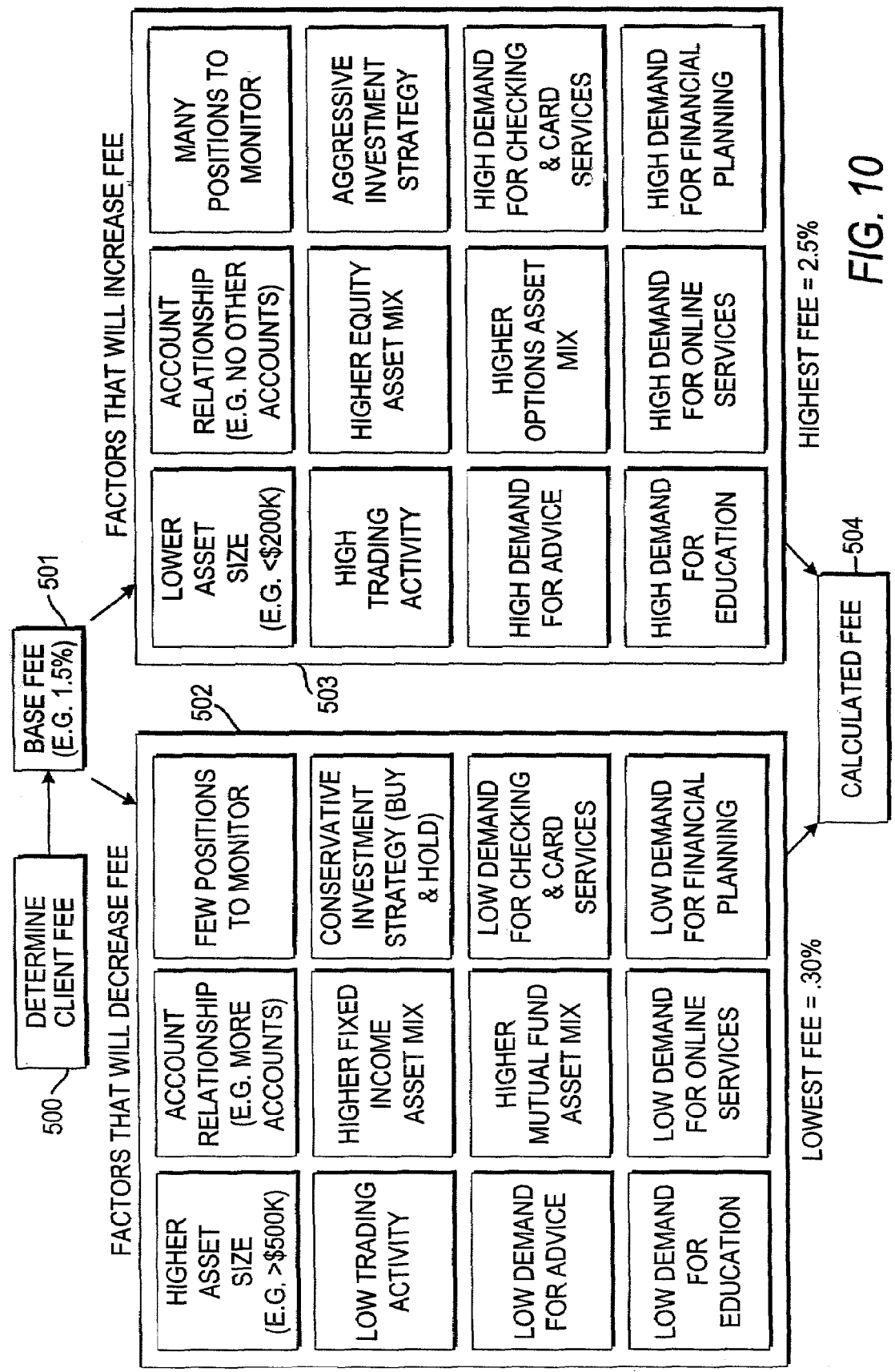
FIG. 10 illustrates the factors which may be evaluated when establishing the fee for the new flat fee brokerage account in accordance with the invention.

FIG. 10 shows in more detail the algorithm used in determining a customized fee (Box 500) for the flat fee brokerage account in accordance with the invention. First, the system applies a base fee (pre-established by the management of the financial services firm) from which a target client may have an annual asset-based flat fee established. With the assistance of the profile questionnaire, allocation analysis, the client's trading history, client database profile, and direct conversations with the client, the financial advisor will determine whether there are certain factors in the client's investment personality that may decrease the client's fee (Box 502) or increase the client's fee (Box 503). Based on these factors, a calculated fee (Box 504) will be derived (e.g., between 0.30% and 2.5%). If any of these factors causes the calculated fee to exceed the program maximum fee (e.g., 2.5%) or to fall below the program minimum fee (e.g., 0.30%), the financial advisor must reevaluate whether the client is suitable for a flat fee brokerage account, or the financial advisor must correct any factors that may have caused the fee to exceed these fee limits. This calculated fee is then discussed with the client and a final negotiated fee is established. Periodically, the financial advisor will review the account with the client to determine whether the client's investment needs have changed, and if so the fee can be increased or decreased (within the defined limits) to reflect changes in any of the factors described in Boxes 502 or 503.

While this invention has been particularly shown and described with reference to the preferred embodiments thereof, it will be understood by those skilled in the art that various changes in form and details may be made without departing from the spirit and scope of the invention.

The invention claimed is:

1. A method for establishing a flat fee brokerage account for a client, said account maintained by a financial services firm and having an established flat fee effective for a predetermined period of time, said client receiving advice from a responsible financial advisor, said method comprising the steps of:

determining a relationship of the flat fee brokerage account to other accounts of the client;

determining a profile of the client;

determining eligibility of the client from predetermined conditions for the flat fee brokerage account;

establishing a recommended flat fee for the flat fee brokerage account based on the profile of the client, wherein the financial services firm establishes the recommended flat fee;

communicating to the responsible financial advisor the recommended flat fee for the client;

receiving from the responsible financial advisor a determination of a final flat fee set by the responsible financial advisor based on negotiations between the responsible financial advisor and the client and the responsible financial advisor's projection of the client's future trading activity;

providing financial services to the client;

processing charges incurred by the flat fee brokerage account;

compensating the responsible financial advisor for the services provided; and reducing the compensation of the financial advisor by a predetermined dollar amount based on the level of trading activity in the flat fee brokerage account, if the level of trading activity falls below the responsible financial advisor's projected trading activity.

2. The method of claim 1, wherein the step of determining eligibility comprises the steps of:

reviewing the holdings of said other accounts;

comparing said holdings to a predetermined minimum holding size of eligible assets;

reviewing the client's objectives and sophistication to determine suitability of the client; and discussing the flat fee with the client to encompass essentially all trading activity of the client and other financial services required by the client.

3. The method of claim 2, further comprising the step of:

providing information to the client on the allocation of assets into asset classes for the client or other financial planning services.

4. A method for establishing a flat fee brokerage account for a client, said account maintained by a financial services firm and having an established flat fee effective for a predetermined period of time, said client receiving advice from a financial advisor, said method comprising the steps of:

verifying a relationship of the flat fee brokerage account to other accounts of the client;

calculating a recommended flat fee for the client using an algorithm that considers client investment objectives, client risk tolerance, and client assets;

communicating to the financial advisor the recommended flat fee for the client;

receiving from the financial advisor a determination of a final flat fee for the flat fee brokerage account set by the financial advisor based on negotiations between the financial advisor and the client and the financial advisor's projection of service fees to be charged to the client;

establishing a minimum fee level based on the projected service fees;

providing investment advice and other brokerage services to the client;

processing actual service fee charges incurred by the flat fee brokerage account;

compensating a responsible financial advisor for the services provided; and assessing a charge back fee against the financial advisor if the actual service fee charges are less than the minimum fee level.

5. The method of claim 4 further comprising the step of:

providing a recommendation to the client on the appropriate allocation of assets into asset classes for the client.

6. The method of any one of claims 1-5 further comprising the step of periodically adjusting the final flat fee in response to actual trading activity of the client and financial services actually delivered to the client.

7. An apparatus for establishing a flat fee brokerage account for a client, said account maintained by a financial services firm and having an established flat fee effective for a predetermined period of time, said client receiving advice from a responsible financial advisor, said apparatus comprising:

means for determining a relationship of the flat fee brokerage account to other accounts of the client;

means for determining a profile of the client;

means for determining eligibility of the client from predetermined conditions for the flat fee brokerage account;

means for establishing a recommended flat fee for the flat fee brokerage account based on the profile of the client, wherein the financial services firm establishes the recommended flat fee;

means for communicating to the responsible financial advisor the recommended flat fee for the client;

means for receiving from the responsible financial advisor a determination of a final flat fee set by the responsible financial advisor based on negotiations between the responsible financial advisor and the client and the responsible financial advisor's projection of the client's future trading activity;

means for providing financial services to the client;

means for processing charges incurred by the flat fee brokerage account;

means for compensating the responsible financial advisor for the services provided; and means for reducing the compensation of the financial advisor by a predetermined dollar amount based on the level of trading activity in the flat fee brokerage account, if the level of trading activity falls below the responsible financial advisor's projected trading activity.

8. The apparatus of claim 7, wherein the means for determining eligibility comprises:

means for reviewing the holdings of said other accounts;

means for comparing said holdings to a predetermined minimum holding size of eligible assets;

means for reviewing the client's objectives and sophistication to determine suitability of the client; and means for discussing the flat fee with the client to encompass essentially all trading activity of the client and other financial services required by the client.

9. The apparatus of claim 8 further comprising:

means for providing information to the client on the allocation of assets into asset classes for the client or other financial planning services.

10. An apparatus for establishing a flat fee brokerage account, said account maintained by a financial services firm and having an established flat fee effective for a predetermined period of time, said client receiving advice from a financial advisor, said apparatus comprising:

means for verifying a relationship of the flat fee brokerage account to other accounts of the client;

means for calculating a recommended flat fee for the client using an algorithm that considers client investment objectives, client risk tolerance, and client assets;

means for communicating to the financial advisor the recommended flat fee for the client;

means for receiving from the financial advisor a determination of a final flat fee for the flat fee brokerage account set by the financial advisor based on negotiations between the financial advisor and the client and the financial advisor's projection of service fees to be charged to the client;

means for establishing a minimum fee level based on the projected service fees;

means for providing investment advice and other brokerage services to the client;
means for processing actual service fee charges incurred by the flat fee brokerage account;
means for compensating a responsible financial advisor for the services provided; and
means for assessing a charge back fee against the financial advisor if the actual service fee charges are less than the minimum fee level.

11. The apparatus of claim 10 further comprising:
means for providing a recommendation to the client on the appropriate allocation of assets into asset classes for the client.

12. The apparatus of any one of claims 7-11 further comprising means for periodic adjustment of the flat fee in response to actual trading activity of the client and financial services actually delivered to the client.

13. A brokerage system that provides a flat fee brokerage account for a brokerage client' said account having an established flat fee effective for a predetermined period of time, said system comprising:
a client interface in communication with the brokerage client such that said brokerage client applies for enrollment in said flat fee brokerage account by providing account information and a client profile to said brokerage system;
a financial advisor interface in communication with the client interface to allow a financial consultant to request said account information and said client profile from the brokerage client, and to provide financial advice to said brokerage client;
a client evaluator in communication with the client interface and the financial advisor interface, said client evaluator comprising:
a personal criteria database for retaining information describing personal investment style and goals for said brokerage client,
a financial criteria database for retaining information describing financial criteria acceptable to enroll said brokerage client in said flat fee brokerage account, and
a client profile database to retain the client profile provided by said brokerage client when applying for enrollment in said flat fee brokerage account;
an accounting processor in communication with the financial advisor interface and the client interface to process charges incurred by said flat fee brokerage account, to assess said flat fee to the client for transaction through the flat fee brokerage account and any other existing brokerage accounts related to said flat fee brokerage account, to compensate the financial advisor, and to charge back to the financial advisor predetermined dollar amounts based on the level of certain trading activity by said brokerage client in said flat fee brokerage account,
whereby said client evaluator assesses the client profile and the account status of said other existing brokerage accounts identified in the provided account information when compared to the personal criteria and the financial criteria to determine whether said brokerage client qualifies for enrollment in said flat fee brokerage account and to recommend a flat fee for said flat fee brokerage account, and whereby said client evaluator provides the determination of qualification for enrollment and the recommended flat fee to the financial advisor through the financial advisor interface such that the financial advisor may establish account relationships for such other existing brokerage accounts, and such that the financial advisor may establish a negotiated flat fee for said flat fee brokerage account based on negotiations between the financial advisor and the client and the financial advisor's projection of the client's future trading activity, and
wherein the accounting processor assesses the charge back to the financial advisor if the level of the certain trading activity falls below the financial advisor's projected trading activity.

14. The brokerage system of claim 13 further comprising a client account administrator in communication with the financial advisor interface and including a client account database, whereby said client account administrator relates any said other existing brokerage accounts of the brokerage client to said flat fee brokerage account.

15. The brokerage system of claim 13 further comprising a brokerage supervisor interface in communication with the client interface and with the financial advisor interface to review the determination of qualification of the brokerage client for enrollment, the negotiated flat fee, and any proposed account relationships for acceptance or rejection of said brokerage client for enrollment in said flat fee brokerage account.

16. The brokerage system of claim 15 further comprising a securities transaction processor in communication with the client interface and with the financial advisor interface to initiate the trading of securities in said flat fee brokerage account and in said other existing brokerage accounts, and in communication with at least one public securities exchange to effectuate said trading of securities.

17. The brokerage system of claim 16 wherein the client account administrator generates an account activity report containing a listing of the number and types of trades, a calculation showing return on assets for all assets within said flat fee brokerage account and said other existing brokerage accounts, and a listing of the allocation of said assets, whereby said financial advisor receives said activity report for review and to provide advice and services to said brokerage client.

18. The brokerage system of claim 13 wherein the client profile details an investment personality of said brokerage client, said investment personality comprising the client's investment objectives and the client's need for transactions, advice and services to meet said investment objectives.

19. A networked brokerage computer system that provides a flat fee brokerage account for a brokerage client, said account having an established flat fee effective for a predetermined period of time, said system comprising:
a data communication network for transfer of digital data;
a client terminal in communication with said data communication network and in communication with said brokerage client, such that said brokerage client provides account information and a client profile to said networked brokerage computer system;
a financial advisor terminal in communication with said data communication network to communicate with the client terminal to allow a financial advisor to request said account information and said client profile from the brokerage client, and to provide financial advice to said brokerage client;
a client evaluation computer processor in communication with said data communication network to communicate with the client terminal and the financial advisor terminal, said client evaluation computer processor comprising:

a first data retention medium containing a personal criteria database for retaining information describing personal investment style and goals for said brokerage client, a second data retention medium containing a financial criteria database for retaining information describing financial criteria acceptable for enrollment in said flat fee brokerage account, and a third data retention medium containing a client profile database to retain the client profile provided by said brokerage client when applying for enrollment in said flat fee brokerage account;

an accounting computer processor in communication with said data communication network to communicate with the financial advisor terminal and the client terminal to process charges incurred by said flat fee brokerage account, to assess said flat fee to the client for transaction through the flat fee brokerage account and any other existing brokerage accounts related to said flat fee brokerage account, to compensate the financial advisor, and to charge back to the financial advisor predetermined dollar amounts based on the level of certain trading activity by said brokerage client in said flat fee brokerage account; and a client account administration computer processor in communication with said data communication network to communicate with the financial advisor terminal and including a fourth digital data storage medium containing a client account database, whereby said client account administration computer processor relates said other existing brokerage accounts of the brokerage client to said flat fee brokerage account;

whereby said client evaluation computer processor assesses the client profile and the account status of said other existing brokerage accounts identified in the provided account information when compared to the personal criteria and the financial criteria to determine whether said brokerage client qualifies for enrollment in said flat fee brokerage account and to recommend a flat fee for said flat fee brokerage account, and whereby said client evaluation computer processor provides the determination of qualification for enrollment and the recommended flat fee to the financial advisor through the financial advisor terminal such that the financial advisor may establish account relationships for said other existing brokerage accounts, and such that the financial advisor may establish a negotiated flat fee for said flat fee brokerage account based on negotiations between the financial advisor and the client and the financial advisor's protection of the client's future trading activity, and wherein the accounting processor assesses the charge back to the financial advisor if the level of the certain trading activity falls below the financial advisor's projected trading activity.

20. The networked brokerage computer system of claim 19 further comprising a brokerage supervisor terminal in communication with said data communication network to communicate with the client terminal and with the financial advisor terminal and to review the determination of qualification of the brokerage client for enrollment, the negotiated flat fee, and any proposed account relationships for acceptance or rejection of said brokerage client for enrollment in said flat fee brokerage account.

21. The networked brokerage computer system of claim 20 further comprising a securities transaction computer processor in communication with said data communication network to communicate with the client terminal and with the financial advisor terminal to initiate the trading of securities in said flat fee brokerage account and in said other existing brokerage accounts, and in communication with a public data communications network to communicate with at least one public securities exchange to effectuate said trading of securities.

22. The networked brokerage computer system of claim 21 wherein the client account administration computer processor generates an account activity report containing a listing of the number and type of trades, a calculation showing return on assets for all assets within said flat fee brokerage account and said other existing brokerage accounts, and a listing of the allocation of said assets, whereby said financial advisor receives said activity report for review and to provide advice and services to said brokerage client.

23. The networked brokerage computer system of claim 19 wherein the client profile details an investment personality of said brokerage client, said investment personality comprising the client's investment objectives and the client's need for transactions, advice and services to meet said investment objectives.

24. A digital data retention medium retaining thereon executable digital code of a program for establishing for a client a flat fee brokerage account maintained by a financial services firm and having an established flat fee effective for a predetermined period of time, said client receiving advice from a responsible financial advisor, said program comprising the steps of:

determining a relationship of the flat fee brokerage account to other accounts of the client;

determining a profile of the client;

determining eligibility of the client from predetermined conditions for the flat fee brokerage account;

establishing a recommended flat fee for the flat fee brokerage account based on the profile of the client, wherein the financial services firm establishes the recommended flat fee;

communicating to the responsible financial advisor the recommended flat fee for the client;

receiving from the responsible financial advisor a determination of a final flat fee set by the responsible financial advisor based on negotiations between the responsible financial advisor and the client and the responsible financial advisor's projection of the client's future trading activity;

providing financial services to the client;

processing charges incurred by the flat fee brokerage account;

compensating the responsible financial advisor for the services provided; and reducing the compensation of the financial advisor by a predetermined dollar amount based on the level of trading activity in the flat fee brokerage account, if the level of trading activity falls below the responsible financial advisor's projected trading activity.

25. The digital data retention medium of claim 24 wherein the step of determining eligibility comprises the steps of:

reviewing the holdings of said other accounts;

comparing said holdings to a predetermined minimum holding size of eligible assets;

reviewing the client's objectives and sophistication to determine suitability of the client; and discussing the flat fee with the client to encompass essentially all trading activity of the client and other financial services required by the client.

26. The digital data retention medium of claim 25 wherein said program further comprises the step of:

provides information to the client on the allocation of assets into asset classes for the client or other financial planning services.

27. A digital data retention medium retaining thereon executable digital code of a program for establishing for a client a flat fee brokerage account maintained by a financial services firm and having an established flat fee effective for a predetermined period of time, said client receiving advice from a financial advisor, said program comprising the steps of:

verifying a relationship of the flat fee brokerage account to other accounts of the client;

calculating a recommended flat fee for the client using an algorithm that considers client investment objectives, client risk tolerance, and client assets;

communicating to the financial advisor the recommended flat fee for the client;

receiving from the financial advisor a determination of a final flat fee for the flat fee brokerage account set by the financial advisor based on negotiations between the financial advisor and the client and the financial advisor's projection of service fees to be charged to the client;

establishing a minimum fee level based on the projected service fees;

providing investment advice and other brokerage services to the client;

processing actual service fee charges incurred by the flat fee brokerage account;

compensating a responsible financial advisor for the services provided; and assessing a charge back fee against the financial advisor if the actual service fee charges are less than the minimum fee level.

28. The digital data retention medium of claim 27, wherein said program further comprises the step of:

providing a recommendation to the client on the appropriate allocation of assets into asset classes for the client.

29. The digital data retention medium of any one of claims 24-28 wherein said program further comprises the step of periodically adjusting the flat fee in response to actual trading activity of the client and financial services actually delivered to the client.

* * * * *